(12) United States Patent
Richardson et al.

(10) Patent No.: US 8,931,252 B2
(45) Date of Patent: Jan. 13, 2015

(54) INTAKE LINER FOR A GAS TURBINE ENGINE

(71) Applicant: Rolls-Royce PLC, London (GB)

(72) Inventors: Giles Anthony Richardson, Chatteris (GB); David MacManus, Olney (GB); Christopher Thomas John Sheaf, Derby (GB)

(73) Assignee: Rolls-Royce PLC, London (GB)

( * ) Notice: Subject to any disclaimer, the term of this patent is extended or adjusted under 35 U.S.C. 154(b) by 27 days.

(21) Appl. No.: 13/713,840

(22) Filed: Dec. 13, 2012

(65) Prior Publication Data

US 2013/0263601 A1    Oct. 10, 2013

(30) Foreign Application Priority Data

Dec. 20, 2011 (GB) .................................. 1121887.2

(51) Int. Cl.
| | |
|---|---|
| *F02G 3/00* | (2006.01) |
| *F02C 7/04* | (2006.01) |
| *F02C 3/32* | (2006.01) |
| *F02C 7/045* | (2006.01) |
| *F02C 7/047* | (2006.01) |
| *F02C 7/057* | (2006.01) |

(52) U.S. Cl.
CPC ... *F02C 7/04* (2013.01); *F02C 3/32* (2013.01); *F02C 7/045* (2013.01); *F02C 7/047* (2013.01); *F02C 7/057* (2013.01); *F05D 2260/601* (2013.01)
USPC .... 60/39.093; 60/226.1; 137/15.2; 244/134 R

(58) Field of Classification Search
CPC .............. F02C 3/32; F02C 7/04; F02C 7/045; F02C 7/047; F02C 7/057; F05D 2260/601
USPC .......... 60/226.1, 269, 39.093; 137/15.1, 15.2; 244/53 B, 134 R, 204, 207
See application file for complete search history.

(56) References Cited

U.S. PATENT DOCUMENTS

| | | | |
|---|---|---|---|
| 4,199,295 A * | 4/1980 | Raffy et al. .................... | 415/115 |
| 4,738,416 A * | 4/1988 | Birbragher ................. | 244/134 B |
| 4,749,150 A | 6/1988 | Rose et al. | |
| 5,447,283 A | 9/1995 | Tindell | |
| 5,841,079 A | 11/1998 | Parente | |
| 6,698,691 B2 * | 3/2004 | Porte .......................... | 244/134 B |

(Continued)

OTHER PUBLICATIONS

Mar. 30, 2012 Search Report issued in British Patent Application No. GB1121887.2.

*Primary Examiner* — Phutthiwat Wongwian
(74) *Attorney, Agent, or Firm* — Oliff PLC

(57) ABSTRACT

A gas turbine engine having a rotational axis, an intake and a compressed gas source; the intake includes a lining having a facing which defines an inlet surface and an array of holes; the array of holes includes at least a first set of holes and a second set of holes, the holes of the first set of holes are angled a relative to a radial line and the holes of the second set of holes are angled β relative to the radial line; the angles α and β are different. An active flow control arrangement including a compressed gas supply pipe, a valve arrangement, a controller, a compressed gas distribution pipe may be provided. Compressed gas may be provided to prevent the formation of separation of a main gas flow through the intake and prevent or remove ice accretion.

16 Claims, 6 Drawing Sheets

(56) References Cited

U.S. PATENT DOCUMENTS

| | | | |
|---|---|---|---|
| 7,617,670 B2 * | 11/2009 | Truax et al. | 60/269 |
| 8,192,147 B2 * | 6/2012 | Haas | 415/144 |
| 8,209,953 B2 * | 7/2012 | Winter et al. | 60/226.1 |
| 8,596,573 B2 * | 12/2013 | Jain | 244/53 B |
| 2003/0006089 A1 | 1/2003 | Ishii | |
| 2008/0164378 A1 | 7/2008 | Owens et al. | |
| 2010/0126798 A1 | 5/2010 | Lalane et al. | |
| 2010/0206664 A1 | 8/2010 | Bagnall | |

* cited by examiner

INTAKE LINER FOR A GAS TURBINE ENGINE

FIELD OF THE INVENTION

The present invention relates to intakes and intake linings and more particularly to intakes and intake linings for a nacelle of a gas turbine engine.

BACKGROUND

The purpose of the intake of civil turbofan gas turbine engines is to ensure that, under all operating conditions, the engine is supplied with the correct quantity of air and that the air has sufficient flow uniformity to allow efficient and stable operation of the engine. The intake design is integrated into the engine nacelle to obtain the lowest level of drag at the operating design point, typically cruise, for maximum efficiency.

For civil turbofans, an optimum intake configuration is a short, near circular, pilot-type intake. This design is highly efficient for subsonic operation, as low levels of pressure loss are achieved under most and possibly all operating conditions.

A pilot intake consists of two geometric regions, a lip and a throat. Downstream of the throat the airflow passes into a diffuser where the flow area is increased up to a fan entry plane. The diffuser acts as a settling length to improve the uniformity of the airflow entering the fan. The lip is a forward section and similar in section to an aerofoil and is shaped to guide the airflow into the engine under all operating conditions; the lip is also optimised to prevent flow separation under cross-wind and incidence operation. If flow separation occurs, this produces significant asymmetry in the total pressure within the intake increasing fan blade stresses and in severe cases engine surge.

The internal surface of the lip is heated, usually with hot air, to minimise or ensure that there is no ice accretion, which could otherwise be shed and damage the engine. Other heating arrangements include electrical heating pads.

The diffuser and throat regions of the intake are often lined with sound-absorbing acoustic panels to reduce noise from the fan and other turbomachinery of the engine.

It is desirable to provide an intake lining system which provides improved flow control to suppress shock waves and/or separation of the airflow from the intake's internal surface that can be caused by cross winds and high incident conditions.

It is also desirable to provide anti-icing and acoustic treatments that minimise weight, complexity and parts count.

SUMMARY OF THE INVENTION

In accordance with the present invention there is provided a gas turbine engine having a rotational axis, an intake and a compressed gas source; the intake is arranged about the rotational axis and includes a lining having a facing which defines an inlet surface and an array of holes; the array of holes comprises at least a first set of holes and a second set of holes, the holes of the first set of holes are angled α relative to a radial line with respect to the rotational axis and the holes of the second set of holes are angled β relative to the radial line; the angles α and β are different; the second set of holes is connected to the compressed gas source.

The angle α may be between 0° and 15°.
The angle α may be approximately 0°.
The angle β may be between 15° and 75°.
The angle β may be between 35° and 55°.
The angle β may be approximately 45°.

The first set of holes may be arranged to attenuate acoustic pressure waves and the second set of holes may be arranged to prevent icing and/or the formation of shock waves and/or boundary layer separation.

The second set of holes may comprise holes that converge between their inlet and outlet.

The second set of holes may comprise holes that diverge between their inlet and outlet.

The second set of holes may comprise holes that converge and diverge in mutually perpendicular directions between their inlet and outlet.

The outlet may be a slot.

The second set of holes may comprise holes having discrete inlets and a common outlet.

The second set of holes may be supplied with a compressed gas.

The second set of holes may be supplied with a compressed gas only during conditions where anti-icing and/or prevention of the formation of shock waves and/or boundary layer separation may occur.

In another aspect of the present invention there is provided a gas turbine engine comprising an intake defining an inlet surface, a compressed gas source and an active flow control arrangement; the intake includes a lining having a facing which defines an inlet surface and an array of holes; the array of holes comprises at least a first set of holes and a second set of holes, the holes of the first set of holes are angled α relative to a radial line and the holes of the second set of holes are angled β relative to the radial line; the active flow control arrangement comprising a compressed gas supply pipe, a valve arrangement, a controller, a compressed gas distribution pipe; the supply pipe fluidly connects between the compressed gas source and the valve arrangement and the distribution pipe fluidly connects between the valve arrangement and intake surface for supply of compressed gas thereto; the active flow control arrangement is operable to supply compressed gas to the intake surface to prevent separation of a main air flow (9) passing through the intake from the inlet surface.

BRIEF DESCRIPTION OF THE DRAWINGS

Embodiments of aspects of the present invention will now be described by way of example only with reference to the accompanying drawings in which.

DETAILED DESCRIPTION

Figure 1:
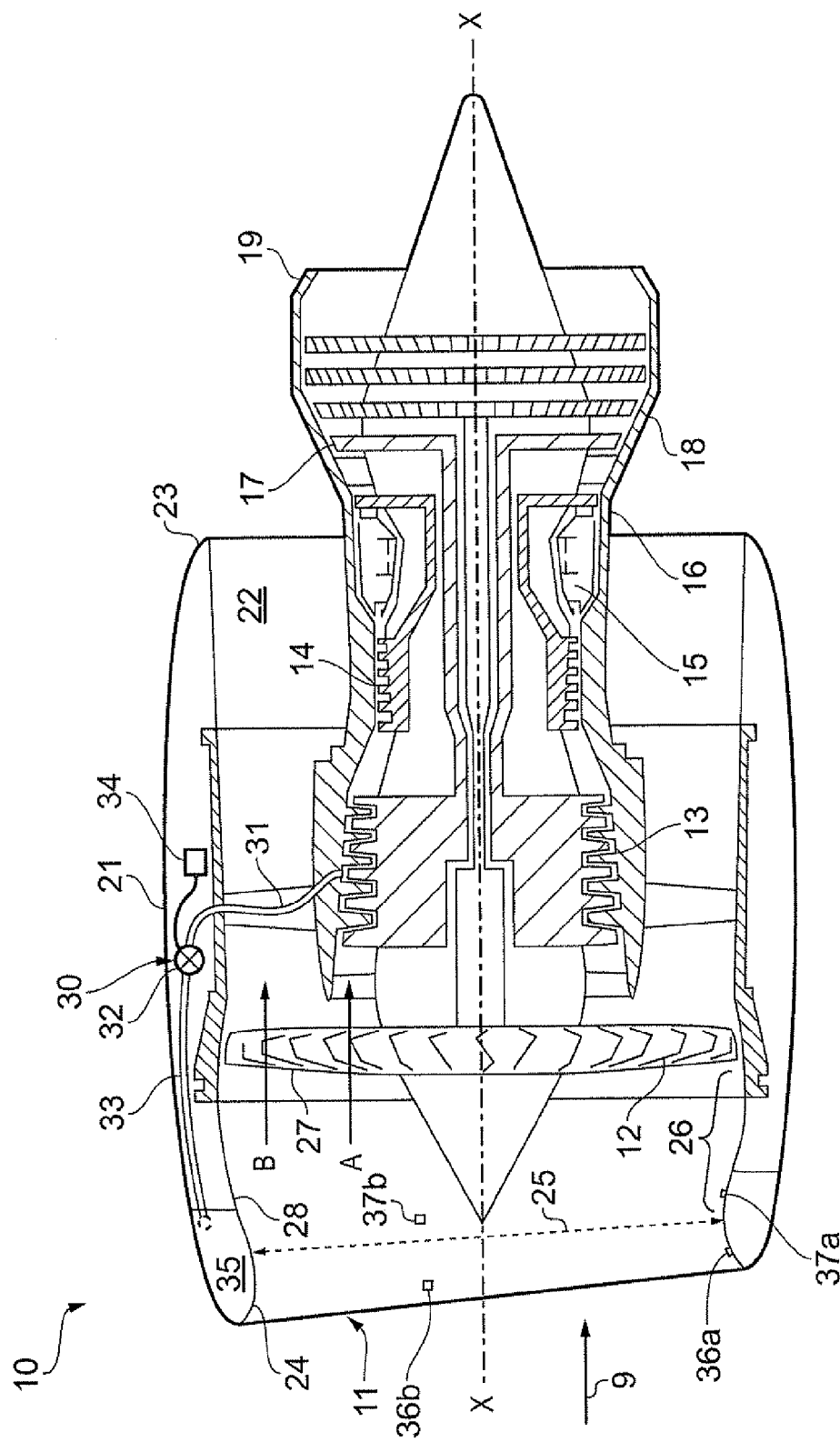
FIG. 1 is a schematic section through a gas turbine engine and nacelle including an intake liner arrangement.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 12, a bypass duct 22 and a bypass exhaust nozzle 23.

The gas turbine engine 10 works in a conventional manner so that a main air flow 9 entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The intake, generally shown at 11, is a pitot-style intake consisting of the geometric regions, a lip 24, a throat 25 and a diffuser 26. The lip 24 is a forward section and guides air into the engine under all operating conditions; the geometric shape of the lip is also optimised to minimise flow separation under cross-wind and incidence operation. If flow separation occurs, this produces significant asymmetry in the total pressure within the intake increasing fan blade stresses and in severe cases engine surge.

Downstream of the lip 24 the intake contracts to a minimum area sized for the engine flow requirements and is known as the throat 25. Downstream of the throat the main air flow 9 passes into the diffuser 26 where the flow area is increased before a fan entry plane 27. The diffuser acts as a settling length to improve the uniformity of the airflow entering the fan 12.

Separation of air entering the intake 11 and a surface 28 of the intake can occur as a result of adverse air flow conditions such as cross flows and high incidence conditions during operation of the gas turbine engine and which can reduce engine efficiency. Separation of air from the surface 28 can cause shock waves and it is therefore an object to suppress any possible separation. These shock wave separations in the flow are generally caused by cross wind and high incidence conditions to the intake causing boundary separation. An active flow control arrangement 30 is provided to blow or present a control gas flow to specific regions of the intake 11 to obviate or alleviate separation and/or shock waves and/or boundary layer separation.

The active flow control arrangement 30 locally re-energises the main air flow 9 into the intake 11 by injecting or presenting a control gas flow in the main airflow or over the surface 28 and preferably into a boundary layer adjacent the intake surface. By supplying a control flow and re-energising the boundary layer prevention or reduction of shock waves is possible. Indeed the active flow control arrangement is capable of mitigating adverse pressure gradients within the intake and particularly adjacent the surface 28.

The location of shockwaves on an intake surface is dependent upon one or many operational and environmental conditions. For a cross wind situation shockwaves are generally located near to a leading edge of the intake lip, but for high incidence situations shockwaves will be closer to the inlet throat. Thus by selectively applying localised flow control gas through the intake surface it is possible to minimise separations around part or all of the intake thereby minimising the amount of control airflow gas required.

As indicated generally the active flow control arrangement 30 can be incorporated or act as part of an acoustic liner system giving additional noise attenuation benefits and duplicity of operation so minimising weight and other complications compared to providing separate linings for avoiding flow separation. Furthermore, the active flow control arrangement 30 may be utilised in de-icing functions providing a third function.

As schematically shown in FIG. 1, the active flow control arrangement 30 comprises a system of pipework 31, 33 connecting between a control gas source(s) (12, 13, 14) and a chamber 35 defined in the intake 11. A valve arrangement 32 is operable via an electronic unit 34 which may be separate or part of an engine electronic control (EEC). The valve arrangement 32 is operable to control the amount and delivery location of the control gas flow around part or all the intake. The control fluid source is shown as the intermediate compressor 13; however, other sources or combined sources include any compressor and/or turbine. EEC logic control and operation of the valve arrangement 32 can consider operational conditions such as relative air speed and direction, flight cycle, engine power condition and sensor readings. Local sensors can be positioned within the intake to monitor parameters, such as local pressures around the intake.

Figure 2:
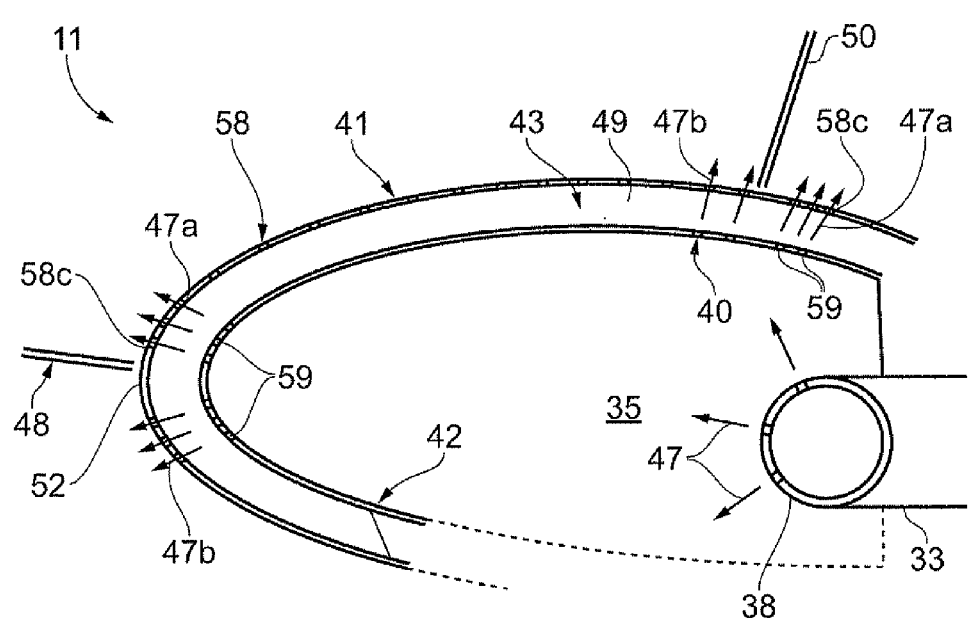
FIG. 2 is a schematic illustration of part of the intake 11 shown in FIG. 1 and comprising a lining 40.

FIG. 2 is a schematic illustration of part of the intake 11 shown in FIG. 1 and comprising a lining 40. The lining 40 comprises a surface liner 41, a spacer 43 and a backing 42. The surface liner 41 and the backing 42 are separated and spaced apart by the spacer 43 to provide structural strength. Usually, the spacer is a honeycomb material 43, but other cellular materials can be used.

The surface liner 41 comprises an array of perforations 58 through its thickness to fluidly connect cells 49 of the cellular material with the main air flow 9 in the inlet 11 or other duct of a gas turbine engine. The combination between the perforations and cells absorb acoustic energy as is well known in the art. Double layered acoustic liners may also be used herein.

The pipework 31, 33 connects to a distribution pipe 38, sometimes known as a piccolo pipe, for distribution of fluid around the chamber 35. The chamber is annular although it may comprise circumferential segments. Similarly, the distribution pipe 38 is annular and in this case is housed within the chamber 35. However, the distribution pipe 38 may also be circumferentially segmented and/or housed external to the chamber 35.

The surface liner 41 defines bespoke boundary-layer apertures 58C although they may be part of the array of perforations 58. The backing 42 defines inlet apertures 59 that allow fluid communication between the chamber 35 and the intake surface 28. Pressurised gas, control fluid flow 47, enters the chamber 35 and flows through the apertures 59, the cells 49 and exits through the surface liner 41. The boundary-layer apertures 58 are positioned at specific locations in order to inject the control fluid flow 47a, 47b at those specific regions of the lining 40.

The active flow control arrangement 30 locally re-energises the boundary layer of the main air flow, in order to prevent the main air flow from separating from the surface 28 and particularly adjacent a shock wave 48, 50. The location and occurrence of shock waves adjacent the intake surface 28 is dependent on the operating condition of the engine, aircraft and environmental conditions. For a cross-wind case shock waves, indicated at 48, usually occur near a leading edge 52 of the intake lip 24. Where the ingested airflow 9 is at a relatively high incidence angle to the inlet the shock waves, indicated at 50, usually occur near to the intake throat 25. By applying this localised flow control through the lining structure, flow separations around the intake can be minimized. In addition, the lining structure also operates as an acoustic lining, particularly in the lip region of the intake.

Figure 3:
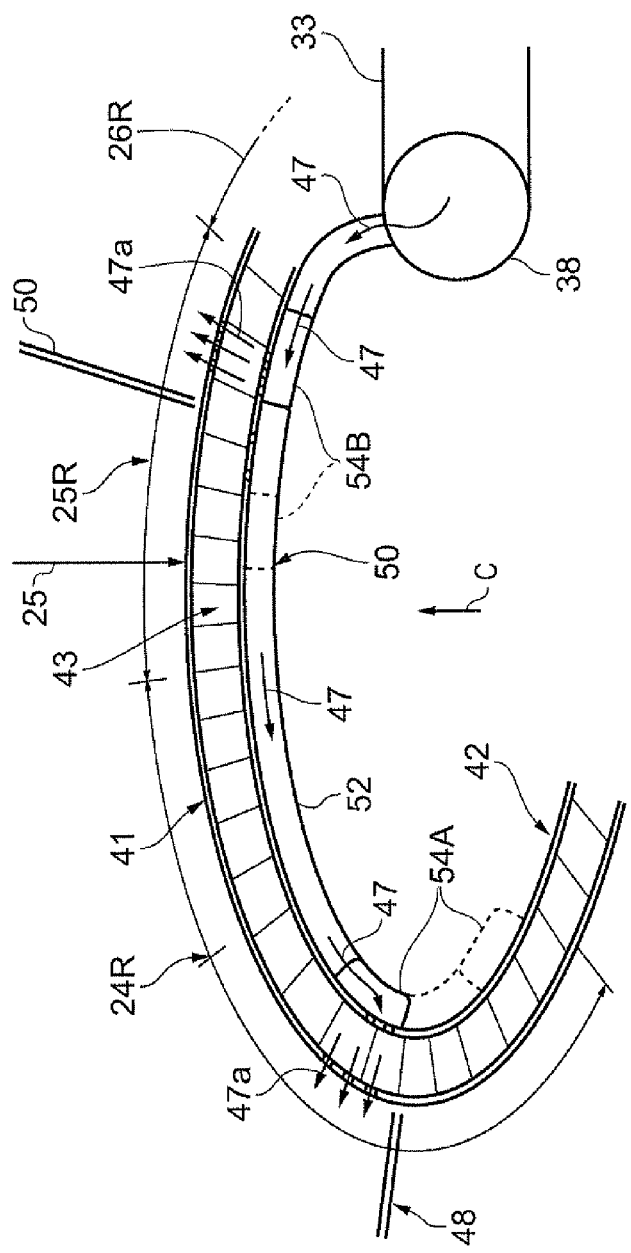
FIG. 3 is another schematic and enlarged section of part of an intake of the nacelle of FIG. 1.

FIG. 3 is another schematic and enlarged section of part of an intake of the nacelle of FIG. 1. Here the intake 11 comprises the lip region 24, the throat region 25 and further downstream a diffuser region 26. The active flow control arrangement 30 further comprises ducting 50 to supply the compressed gas to the intake surface in the lip region 24, the throat region 25 and the diffuser region 26. It is within these regions that shock waves or main gas flow 9 separation may occur.

The pipework 31, 33 connects to the distribution pipe 38 which then connects to a distribution network 50. The distribution network 50 comprises ducting having generally axial conduits 52 connecting between generally circumferential conduits 54A, 54B. The circumferential conduits 54A and 54B feed compressed gas to the lining 40 and then through the surface liner 41 and over the surface to re-energise the boundary layer preventing main flow separation and avoiding harmful shock waves from forming.

Additional circumferential conduits 54 are shown in dashed lines to feed compressed gas to further areas where separation of the main gas flow from the surface 28 may occur.

Figure 4:
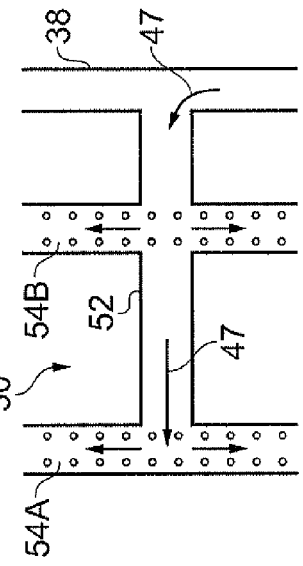
FIG. 4 shows a distribution network 50 having conduit 52 connecting between the distribution pipe 38 and two circumferential conduits 54A and 54B.

FIG. 4 shows a distribution network 50 having conduit 52 connecting between the distribution pipe 38 and two circumferential conduits 54A and 54B. The circumferential conduits 54 feed compressed gas to the lining 40 in two axial positions, in this case to the lip and throat regions 24R and 25R respectively. Further circumferential conduits can be fed via axial conduit 52 or additional axial conduits, thereby other or additional locations of the surface 28 can be fed control gas 47.

Figure 5:
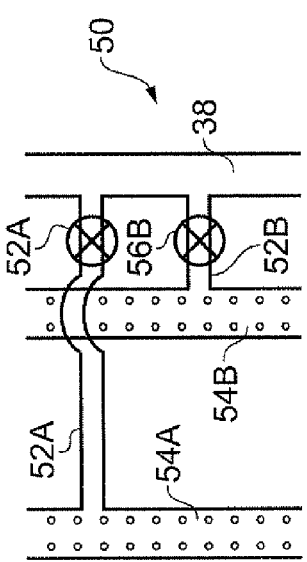
FIG. 5 shows another distribution network 50 having axial conduits 52A and 52B connecting between the distribution pipe 38 and each of two circumferential conduits 54A and 54B respectively.

FIG. 5 shows another distribution network 50 having axial conduits 52A and 52B connecting between the distribution pipe 38 and each of two circumferential conduits 54A and 54B respectively. In this case, controllable valves 56A and 56B are provided on the axial conduits 52A and 52B. the valves 56A and 56B are operable to allow control gas 47 to either one or both or more circumferential conduits 54A and 54B. Alternatively, the valves 56A and 56B may be provided on the junction of the distribution pipe 38 and axial conduits or circumferential conduits 54A and 54B and axial conduits 52A and 52B.

Figure 6:
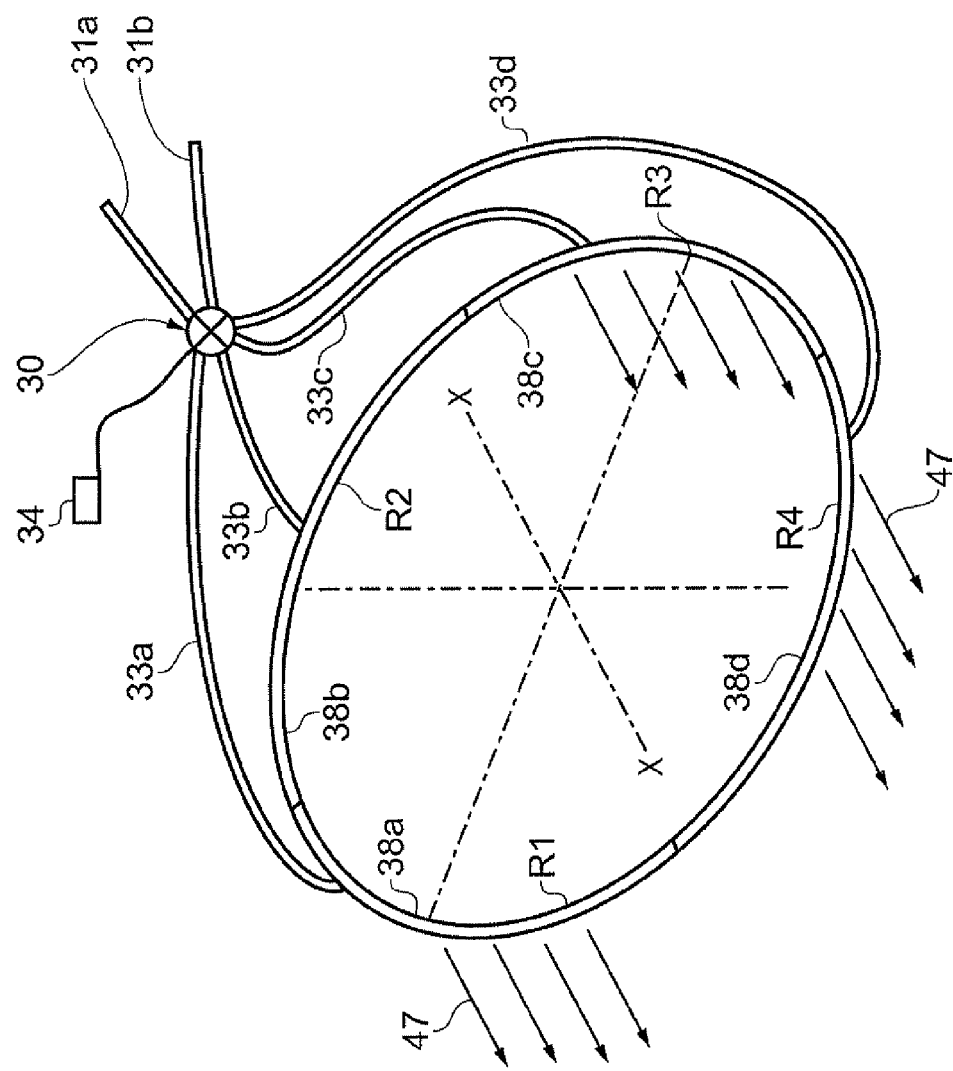
FIG. 6 is a schematic illustration of part of the active control flow arrangement.

FIG. 6 is a schematic illustration of part of the active control flow arrangement. Shown are two supply pipes 31a and 31b coming from two different sources of compressed gas. The two supply pipes 31a and 31b connect to the valve arrangement 30 and further pipes 33a, 33b, 33c and 33d take compressed gas 47 to four zones or regions R1, R2, R3 and R4 around the circumference of the intake 11. The circumferential regions R1, R2, R3 and R4 comprise a lower region (R4), side regions (R1, R3) and an upper region (R2).

The valve arrangement 30 is operable via controller 34 to select either one of the two (or more) compressed gas supplies or both simultaneously. The valve arrangement 30 is operable via controller 34 to select which pipe or pipes 33a, 33b, 33c and 33d takes compressed gas 47 to which of the four (or more) zones or regions R1, R2, R3 and R4.

The two gas supplies are from two sources of different pressures and thus the pressure of the gas can be delivered in any desired quantity or temperature to any part of the intake surface 28. The two or more sources of compressed gas can be from different stages of the same compressor and/or different compressor including the intermediate and high pressure compressors as well as the low pressure compressor or fan.

Figure 7:
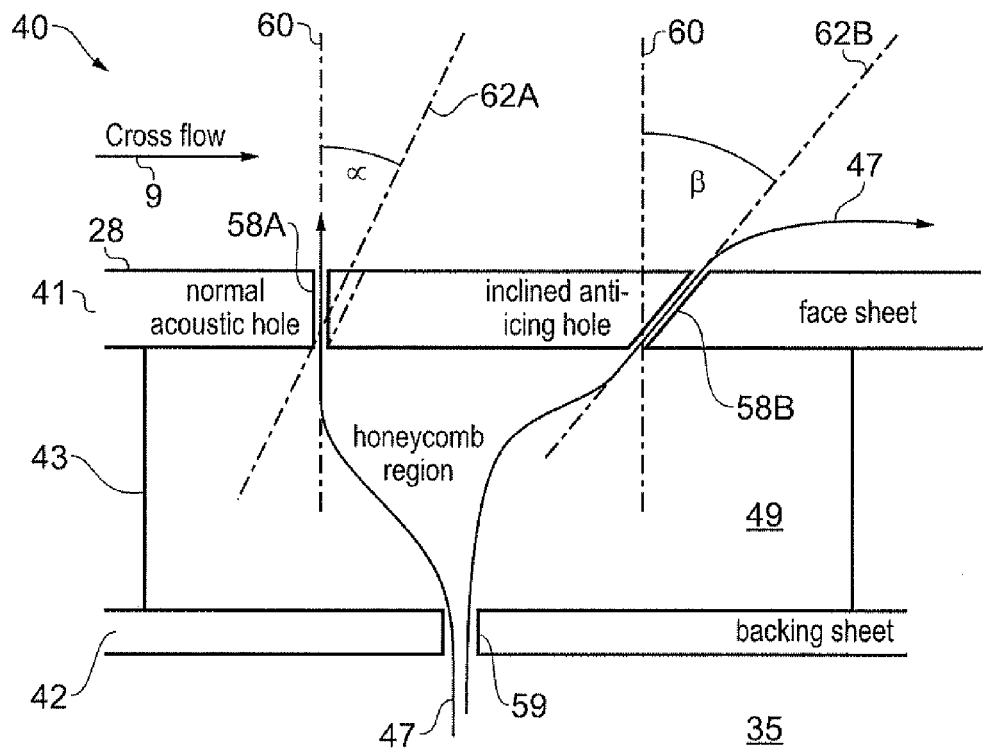
FIG. 7 shows an array of perforations or holes 58 that comprises at least a first set of holes 58A and a second set of holes 58B.

In FIG. 7 the array of perforations or holes 58 comprises at least a first set of holes 58A and a second set of holes 58B. The first set of holes 58A are arranged to primarily to attenuate acoustic pressure waves travelling through the intake 11. The second set of holes 58B are arranged to feed or inject relatively warmer/hotter compressed gas 47 adjacent the facing sheet 41 to prevent or remove ice. As hereinbefore mentioned the second set of holes 58B can also be used to prevent or reduce the formation of shock waves and/or main gas flow 9 separation from the surface 28. The first set of holes 58A can be referred to as 'acoustic holes' and the second set of holes 58B can be referred to as 'gas injection holes'; however in the embodiments below each type of hole may have some of the benefits of the other.

The first set of holes 58A and the second set of holes 58B have respective centre-lines 62A, 62B and are distinguished from one another by a difference in their angles relatives to a radial line 60. The radial line 60 is with respect to the main engine rotational axis X-X. Where the intake 11 is asymmetrical and/or drooped the radial line 60 may be with respect a centre of area line through the intake. The holes of first set of holes 58A are angled α relative to the radial line and the holes of the second set of holes are angled β relative to the radial line; the angles α and β are different.

In one embodiment the holes of first set of holes 58A are approximately normal to the surface and therefore angled α=0°, i.e. parallel to the radial line. These holes are angled and arranged to attenuate acoustic pressure waves. For the primary purpose of attenuation the angle α may be between 0° and 15° from the radial line. The angle α may be rearwardly as shown in FIG. 7, forwardly and/or circumferentially with respect to the engine and may be a compound angle being circumferentially inclined and rearwardly or forwardly inclined.

The holes of the second set of holes 58B have respective centre-lines 62B and define the angle β to the radial line 60. These holes are angled and arranged to supply relatively warm gas adjacent the surface 28 to prevent ice accretion or remove ice already formed. The angle β is approximately 45°; however, β may be between 35° and 55° although the benefits of these holes can be achieved with an angle β between 15° and 75°.

Although each of the first set of holes 58A and the second set of holes 58B has a primary purpose each may also partially provide some of the benefits of the other. The first set of holes 58A is supplied with compressed gas flow 47 which enters the cell(s) 49 through backing sheet 42 via chamber 35. Thus the gas 47 can pass through the holes 58A to also prevent ice accretion or remove ice from the surface 28. The second set of holes 58B may also attenuate acoustic pressure waves present in the intake. Although gas flow 47 is passing out of the facing sheet 41 the pressure wave can still passes through the hole 58B to the cell 49 thereby being attenuate. Although the angle of hole 58B is not ideal for attenuation, noise is still attenuated.

Furthermore and as herein described the first set of holes 58A and/or the second set of holes 58B may be used to supply the gas flow to the surface or boundary layer to prevent the formation of shock waves or prevent the formation of separation of the main gas flow from the surface 28. Indeed the combination of the differently angled holes 58A, 58B can be particularly useful depending aircraft, engine and environmental conditions and the particular requirement for suppressing shock waves and/or flow separation. The angle of the holes 58A enables the compressed gas flow 47 to penetrate further into the main gas flow 9, whereas the holes 58B enables the compressed gas flow 47 to be directed more closely to the surface. Thus the combination of normal and inclined holes gives a greater range of quantity and/or height above the surface 28 that the compressed gas flow 47 can be injected.

Figure 8:
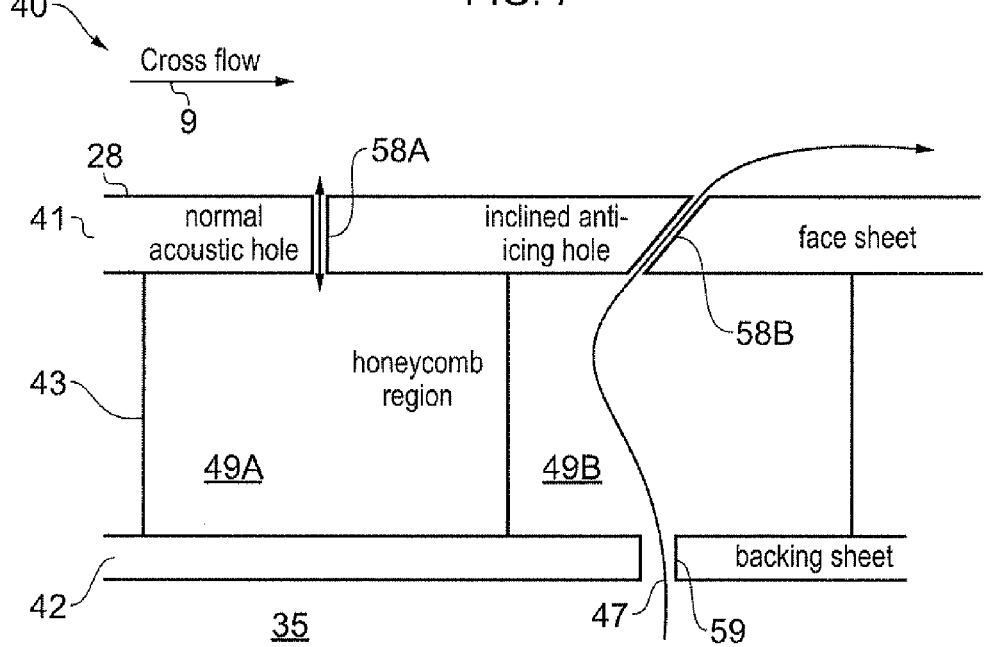
FIG. 8 shows an arrangement in which holes 58A are not supplied with the compressed gas source 47.

Referring now to FIG. 8 like elements are given the same reference numbers as previously described. In this embodiment, the holes 58A are not supplied with the compressed gas source 47. The hole(s) 58A fluidly connects a cell 49A with the intake 11 and main gas flow passing 9. Another cell 49B is associated with the holes 58B and has a hole 59 through the backing sheet 42 to allow compressed gas flow 47 into the cell and exit through the hole 58B in order for anti-icing use and/or shock wave suppression.

Figure 9:
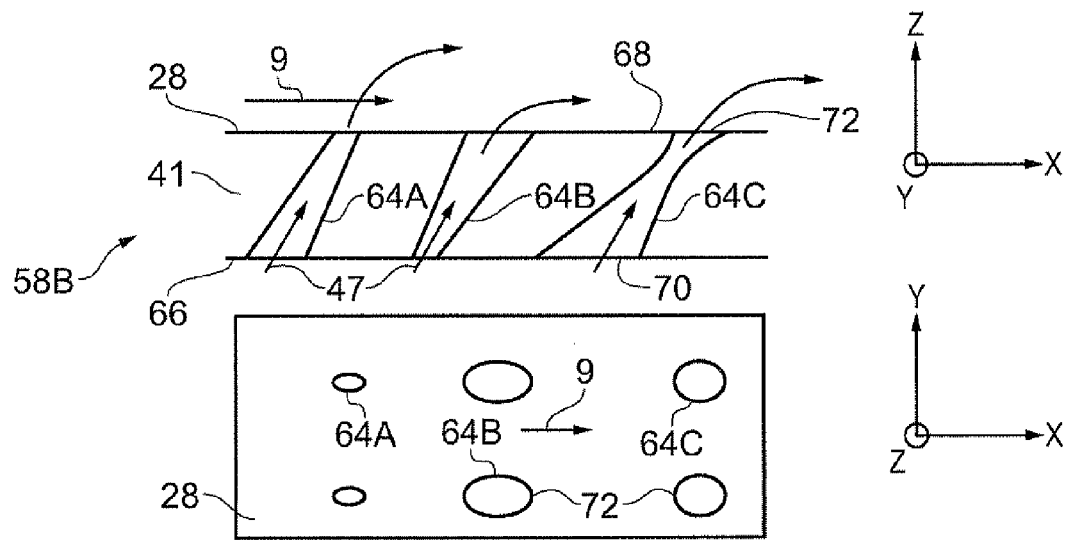
FIG. 9 shows a section through a part of the facing sheet 41 and a plan view of the radially inward surface 28 over which main gas flow 9 passes.
Figure 10:
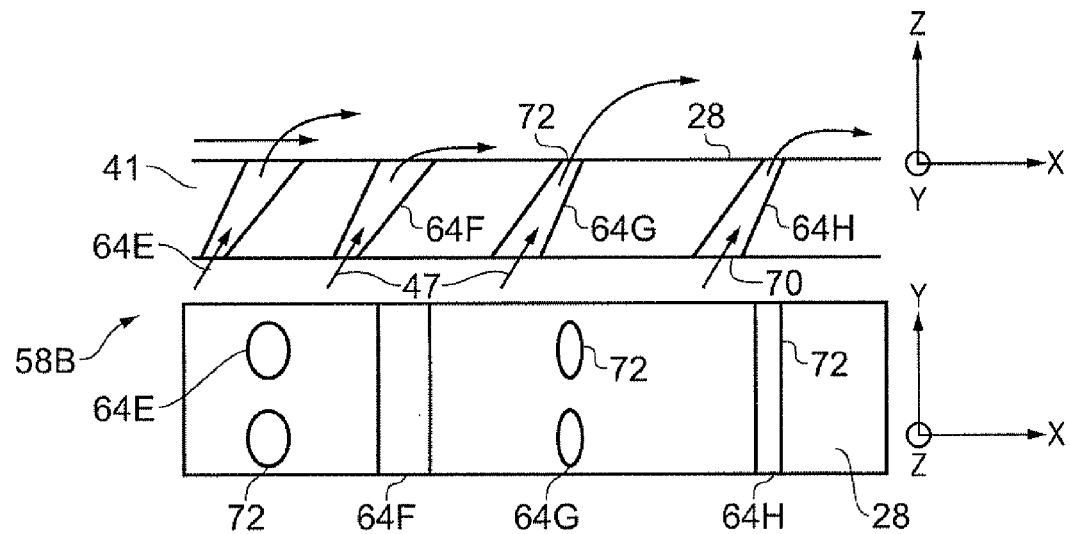
FIG. 10 shows another section through a part of the facing sheet 41 and a plan view of the radially inward surface 28 over which main gas flow 9 passes.

FIGS. 9 and 10 show sections through a part of the facing sheet 41 and plan views of the radially inward surface 28 over which main gas flow 9 passes. These figures show some alternative configurations of the holes 58A and 58B to further improve on the functioning of the intake lining 40. These improvements relate to acoustic attenuation, suppression of main airflow separation from the surface, prevention of shock waves and anti-icing. Each hole configuration may be used in conjunction with any other or others in the array of holes. These holes may be inclined as hereinbefore described, in any direction or normal to the surface 28.

In FIGS. 9 and 10, the axes X, Y, Z relate to the axial (engine rotational axis XX), the circumferential and radial directions respectively.

In FIG. 9, the cross-sectional flow area of hole 64A is convergent between the facing's radially outer surface 66 and radially inner surface 68, 28. This will accelerate the flow allowing a great depth of penetration into the main air flow 9. The convergence is in the direction of flow of compressed gas flow 47.

The cross-sectional flow area of hole 64B is divergent between the facing's radially outer surface 66 and radially inner surface 68, 28. This will decelerate the flow allowing the compressed gas to remain near to the surface 66, 28. The divergence is in the direction of flow of compressed gas flow 47.

The holes 64A, 64B and 64C are generally circular in cross-section and therefore where the hole is angled an elliptical inlet or outlet is formed on the surface as can be seen on the plan view. The elliptical outlet has its longer dimension in the direction of the main flow 9 direction.

The cross-sectional flow area of hole 64C is convergent then divergent between the facing's radially outer surface 66 and radially inner surface 68, 28. In this embodiment there is an overall decrease in cross-sectional flow area between inlet and outlet, however, it is possible to have the same inlet and outlet areas. This hole configuration allows a lower pressure drop for the flow through the hole and therefore allows a lower pressure supply or more compressed gas therethrough for a given pressure. This hole configuration also allows smooth entry and by accelerating the flow at the throat and diffusing it thereafter, the compressed gas may be fully diffused and can be accelerated to a high velocity allowing increased penetration into the boundary layer.

In FIG. 10, hole 64E diverges either in one or both the XZ plane and the XY plane so that the air flow 47 reduces in velocity as it passes out of the outlet. Relative to a constant cross sectional area hole, slowing the flow down means that the airflow will adhere to the surface 28 better, whilst also spreading out more on the surface 28 and therefore can be more effective for the same amount of airflow 47 or operate with a reduced amount of airflow.

From a generally circular or ellipsoidal inlet, hole 64F diverges in the XZ and XY planes to form an exit slot. A number of inlets may feed a single outlet slot. The airflow is slowed even further in this configuration as the outlet area can be greater than for hole 64E.

Hole 64G converges in the XZ plane, but diverges in the XY plane so that its inlet and outlet areas are approximately equal, although the outlet's area can be more or less than the inlet area. The airflow 47 therefore enters and exits the hole 64G at approximately the same velocity. These holes are useful to inject compressed gas into the main airflow above the surface 28.

Hole 64H diverges only in the XY plane to form an outlet slot. The hole may also converge in the XZ plane. A number of inlets may feed the single outlet slot thereby forming a even distribution of compressed gas over the surface 28.

The various hole configurations and combinations enable each liner 40 to be optimized to attenuate acoustic pressure waves, prevent the formation of shock waves and/or main gas flow 9 separations from the surface 28 and prevent ice from forming and/or remove ice formations. All of these hole configurations may be utilised to inject the compressed gas 47 into or above the boundary layer of the main gas flow passing over surface 28.

Thus selection of position and configurations of these holes will enable minimisation of the impact of anti-icing gas flow on the main gas flow in terms of minimising drag and boundary layer thickening.

These hole configurations can maximise the heat transfer performance of the anti-icing flow, thus requiring less anti-icing gas mass-flow which helps to minimise the use of parasitic bleed from a compressor or other compressed gas source.

The hole configurations shown in FIGS. 9 and 10 are primarily used for anti-icing and/or prevention of the formation of shock waves and/or boundary layer separation. These hole configurations also provide some acoustic attenuation, although when implemented in conjunction with the 'acoustic holes' 58A described with reference to FIGS. 7 and 8, the overall liner 40 having an arrangement or combination of acoustic and gas flow holes.

Referring back to FIG. 1, further the active flow control arrangement 30 comprises at least one sensor 36a, 36b, 37a, 37b positioned within the intake. The sensor(s) is connected to the controller 34 which controls the valve arrangement 30 to control the supply of compressed gas to the intake surface 28. An array of sensors 36a, 36b, 37a, 37b comprises at least one sensor positioned relative to a number of axial and/or circumferential regions of the intake. Thus the active flow control arrangement 30 is capable of supplying control gas 47 to any one or more regions of the intake surface 28 where a sensor senses a parameter that passes a predetermined threshold value indicative of the possibility of flow separation.

The gas turbine engine 10 may be operated by determining a possible formation of separation of the main air flow from the surface 28 and blowing compressor gas onto the surface or into a boundary layer adjacent the surface to prevent separation of the main air flow from the surface 28. Using the above described apparatus, determining the axial and/or circumferential location(s) of a possible formation of separation of the main air flow from the surface (28) enables a minimum amount of control gas to be supplied. Off-taking compressed gas from a compressor can be detrimental its performance and therefore engine efficiency so minimising the amount of compressed gas used is beneficial.

Where the active flow control arrangement 30 comprises sensors 36a, 36b, 37a, 37b located in the intake 11 and their sensed parameters input to the controller 34 it is possible to determine the possible formation of separation of the main air flow from the surface 28 comprises the steps of by sensing the parameter, in this case usually pressure, of the main gas flow over the surface 28. The sensed pressure is then compared to a predetermined or threshold value where it is known that a possible formation of separation of the main air flow from the surface 28 may occur.

Alternatively, the controller 34, programmed with an algorithm, receives engine and/or flight operational parameters, and compares these to a predetermined or threshold value where it is known that a possible formation of separation of the main air flow from the surface 28 may occur. The engine operational parameter(s) comprise any one or more or combination of a flight cycle condition, airspeed, an angle of incidence, an engine throttle position, cross-wind strength and direction and weight on wheels.

An efficient way of using compressed gas is by pulsing the flow. Pulsing may be either stopping and starting the flow or modulating the mass flow rate. Gas jets issuing from the holes not only inject a quantity of air into the main gas flow but the jet causes secondary vortices to form around it and which help stabilise and/or reduce the formation of separation. Where the jets are pulsed these secondary vortices persist downstream even after the jet is reduced or switched off. Thus by pulsing the supply of gas to the holes that form the jets, the same beneficial effect of separation suppression can be realised with a significantly reduced high pressure bleed flow and improved system efficiency.

The active flow control arrangement and its method of use is intended to prevent possible formation of separation of the main air flow from the surface 28. However, by combining the apparatus and method of using it with an acoustic liner the benefits of both can still be achieved. Indeed the perforations in the lining 41 can be used to supply the control gas to the surface and/or the boundary layer to re-energise the main flow.

Where environmental conditions exist to cause possible ice formations on the intake, the active flow control arrangement can also be operated to supply heated compressed gas to the surface of the intake and thereby prevent ice build up. The control valves are operable to impart pulsing to the anti-ice gas flow through the (acoustic) liner to maximise shock suppression, while minimising the use of anti ice air. In this case, the sensors 36a, 36b, 37a, 37b also sense temperature and relay this parameter to the EEC for processing in consideration of operation of the active flow control arrangement as an anti-icing system. The EEC 34 may decide to preferentially use hotter gas from a different source either mixed or discreet for anti-icing measures rather than possibly cooler gas for preventing main air flow separation.

Thus there is disclosed an active flow control arrangement which is capable of delivering a control gas to the intake of a gas turbine engine to help prevent main air flow separation and/or ice accretion while attenuating noise from the turbomachinery. The active flow control arrangement provides minimal use of compressed gas and weight reduction, while greatly improving the quality of the main air flow into the engine for improved operational performance and reduction of damage.

Other embodiments will be apparent to the skilled person from the teachings herein. For example, where a double layer liner is used the compressed gas supply could be routed circumferentially and/or axially through the radially outer layer of spacer material. Thus the distribution network 50 is formed by the radially outer layer of spacer material.

The invention claimed is:

1. A gas turbine engine, comprising:
   an intake that is arranged about a rotational axis of the gas turbine engine and that comprises a lining, the lining comprising:
   a facing which defines an inlet surface and an array of holes;
   a backing defining an array of apertures, the facing and the backing defining a chamber; and
   a spacer separating the facing and the backing,
   wherein the array of holes comprises:
   a first set of holes; and
   a second set of holes connected to a compressed gas source via the chamber, the apertures, and the spacer,
   wherein a hole of the first set of holes is disposed at a first angle relative to a normal plane of an inlet of the hole of the first set of holes and a hole of the second set of holes is disposed at a second angle different from the first angle relative to a normal plane of an inlet of the hole of the second set of holes.

2. A gas turbine engine as claimed in claim 1 wherein the first angle is between 0° and 15°.

3. A gas turbine engine as claimed in claim 1 wherein the first angle is approximately 0°.

4. A gas turbine engine as claimed in claim 1 wherein the second angle is between 15° and 75°.

5. A gas turbine engine as claimed in claim 1 wherein the second angle is between 35° and 55°.

6. A gas turbine engine as claimed in claim 1 wherein the second angle is approximately 45°.

7. A gas turbine engine as claimed in claim 1 wherein the first set of holes is arranged to attenuate acoustic pressure waves and the second set of holes is arranged to prevent icing and/or the formation of shock waves and/or boundary layer separation.

8. A gas turbine engine as claimed in claim 1 wherein the second set of holes comprises holes that converge between their inlet and outlet.

9. A gas turbine engine as claimed in claim 1 wherein the second set of holes comprises holes that diverge between their inlet and outlet.

10. A gas turbine engine as claimed in claim 1 wherein the second set of holes comprises holes that converge and diverge in mutually perpendicular directions between their inlet and outlet.

11. A gas turbine engine as claimed in claim 8 wherein the outlet is a slot.

12. A gas turbine engine as claimed in claim 8 wherein the second set of holes comprises holes having discrete inlets and a common outlet.

13. A gas turbine engine as claimed in claim 1 wherein the second set of holes is supplied with a compressed gas.

14. A gas turbine engine as claimed in claim 8 wherein the second set of holes is supplied with a compressed gas only during conditions where anti-icing and/or prevention of the formation of shock waves and/or boundary layer separation may occur.

15. A gas turbine engine, comprising:
an intake that is arranged about a rotational axis of the gas turbine engine and that comprises a lining, the lining comprising:
   a facing which defines an inlet surface and an array of holes, the array of holes comprises:
      a first set of holes; and
      a second set of holes, wherein a hole of the first set of holes is disposed at a first angle relative to a normal plane of an inlet of the hole of the first set of holes and a hole of the second set of holes is disposed at a second angle different from the first angle relative to a normal plane of an inlet of the hole of the second set of holes;
   a backing which defines an array of apertures, the facing and backing defining a chamber; and
   a spacer separating the facing and the backing;
an active flow control arrangement comprising a compressed gas supply pipe, a valve arrangement, a controller, a compressed gas distribution pipe,
wherein the supply pipe fluidly connects between the compressed gas source and the valve arrangement and the distribution pipe fluidly connects between the valve arrangement and intake surface for supply of compressed gas thereto, and
wherein the active flow control arrangement is operable to supply compressed gas to the intake surface to prevent separation of a main air flow passing through the intake from the inlet surface.

16. As gas turbine engine as claimed in claim 1, wherein the diameter of a first opening of the second set of holes is different from the diameter of a second opening of the second set of holes.

* * * * *